May 18, 1971  R. B. DYOTT ETAL  3,579,316

PROCESS FOR OPTICAL WAVEGUIDE COUPLER

Filed Nov. 4, 1968

RICHARD B. DYOTT,
& GEORGE A. CLARK,
INVENTOR

BY *Hall & Houghton*

ATTORNEY

United States Patent Office 3,579,316
Patented May 18, 1971

3,579,316
PROCESS FOR OPTICAL WAVEGUIDE COUPLER
Richard Burnaby Dyott, Chalfont St. Peter, and George Archer Clark, Stanmore, England, assignors to Her Majesty's Postmaster General, London, England
Filed Nov. 4, 1968, Ser. No. 773,195
Claims priority, application Great Britain, Nov. 8, 1967, 50,919/67
Int. Cl. C03c 23/20; G02b 5/14; H01s 3/00
U.S. Cl. 65—4    4 Claims

ABSTRACT OF THE DISCLOSURE

A method is disclosed of coupling optical waveguides together for energy transfer from one waveguide to another. The waveguide ends are inserted into a glass capillary tube of refractive index lower than that of the waveguide cladding. The closely proximate ends of the waveguides and the capillary are heated to softening point and then pulled out until the diameter of the sleeve approximates to that of a waveguide.

BACKGROUND OF THE INVENTION

This invention relates to methods of coupling optical waveguides together. An optical waveguide comprises a composite glass fibre with a glass core whose diameter is of the order of the free space wavelength of light to be propagated along the waveguide, the core being coated with a glass cladding material whose refractive index is less than that of the core material.

It is sometimes necessary to couple together lengths of optical waveguide for the purpose of transferring some or all of the energy transmitted along one waveguide to another waveguide.

For the purpose of coupling together lengths of waveguide, the direct method of butting the end of one waveguide to the end of another waveguide and aligning the cores produces the formidable problem of positioning the abutting ends to within fractions of a micrometre. An alternative method of radiating from the end of one waveguide into a lens system and re-focussing on to the other core inevitably produces energy losses which may be unacceptable.

It is an object of the present invention to provide a method of couplings for optical waveguides together which is simpler than existing methods.

SUMMARY OF THE INVENTION

According to the present invention a method of coupling together for energy transfer at least two optical waveguides comprises the steps of inserting the ends of the waveguides into a capillary tube whose refractive index is less than that of said cladding until the waveguides overlap, heating that part of the tube surrounding the overlapping ends to fuse those ends of the tube and then pulling out the heated part until the outside diameter thereof falls to a value substantially equal to that of the waveguides and the cores of the waveguides over the pulled out part become vanishingly small.

The closeness of proximity may be controlled by threading one of the waveguides through a sleeve of length shorter than that of the capillary tube and of a glass material whose refractive index is the same as that of the material of the capillary tube, and then positioning the sleeve inside the tube. The part of the capillary tube to be heated is that surrounding the sleeve.

The internal diameter of the capillary tube is such as just to accommodate the waveguides with the coupling arrangement used.

Where the method is employed to couple a first waveguide to a second waveguide, the capillary tube is threaded completely through with both waveguides one of which has previously had threaded on to it the sleeve of short length and of a glass material whose refractive index is the same as that of the material of the capillary tube. The sleeve is positioned within the length of the tube which is then heated over that part surrounding the sleeve and pulled out as before.

If the sleeve is made of a material whose refractive index is dependent upon an electric field applied to it, the coupling between the waveguides can be varied by changing the intensity of the field and so a modulation or demodulation can be effected.

The method of coupling together at least two optical waveguides may comprise the steps of inserting the waveguides into a capillary tube of a glass material of refractive index lower than that of the glass material forming the cladding of the cores of the waveguides, until the waveguides are in contact, heating that part of the capillary tube surrounding the contacting parts of the waveguides to the softening temperature of the materials, and pulling the heated part until the outside diameter thereof falls to a value substantially equal to that of the diameter of the waveguides.

In one particular method, the waveguides are overlapped inside the capillary tube and that part of the latter surrounding the overlapped parts of the waveguides is heated.

If the method is employed to join a first waveguide to a second waveguide only a slight overlap is required. The internal diameter of the capillary tube is about equal to the sum of the diameters of the waveguides.

Alternatively, the method of coupling together two optical waveguides comprises the steps of squaring the ends of the waveguides, inserting the squared ends into a capillary tube from the opposite ends, the capillary tube being of a glass material of refractive index lower than that of the glass material forming the cladding of the cores of the waveguides and of an internal diameter about equal to the diameter of one waveguide until the squared ends abut, heating that part of the tube surrounding the abutting ends to the softening temperature of the materials, and pulling the heated part until the outside diameter thereof falls to a value substantially equal to that of the diameter of the waveguides.

DESCRIPTION OF PREFERRED EMBODIMENT

Figure 1:
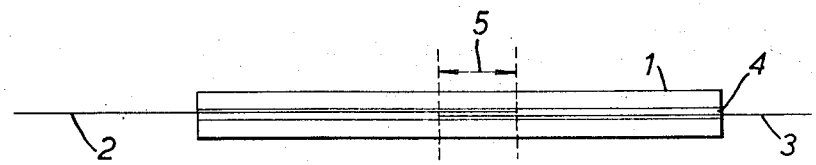
FIGS. 1 and 2 are schematic drawings of components prior to processing by a first method and second method respectively.

Referring first to FIG. 1, there is shown a capillary tube 1 of a glass material with a refractive index smaller than that of the cladding of the waveguides 2, 3 to be joined. The diameter of the bore 4 of tube 1 is about equal to the sum of the diameters of the waveguides 2, 3 i.e. of a size to receive the two composite fibers in side-by-side juxtaposed relation, while the outside diameter of the tube is about 50 times the bore diameter. The length of the tube 1 is about 10 cm.

The end portions of the two optical waveguides 2, 3 to be joined are positioned in the bore 4 of the tube 1 so that they overlap slightly at about the middle of the tube. It is convenient to thread waveguide 2 through the full length of the bore 4 first, and then waveguide 3 similarly from the opposite end, finally withdrawing both until an overlap of about 1 cm. is obtained.

The part 5 of the tube 1 surrounding the overlapping ends of the waveguides 2, 3 is then heated to its softening temperature and then pulled out until the diameter of that part is approximately equal to the outer diameter of the waveguides.

Alternatively, the end portions of the optical waveguides 2, 3 to be joined together are squared off and the waveguides are threaded from opposite ends into the bore 4 of the tube 1 until the ends abut. For this method, the diameter of the bore 4 is about equal to the diameter of the waveguides, for the same size of capillary tube 1. The part of the tube 1 surrounding the abutting ends is heated to its softening point and until the abutting ends fuse together and the tube is then pulled out until the diameter of that part is approximately equal to the outer diameter of the waveguides. The technique is that of FIG. 1 with zero overlap, the final result being that shown in FIG. 3.

Figure 3:
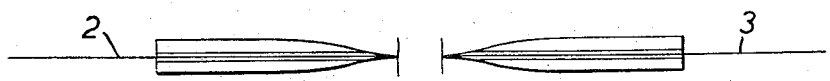
FIGS. 3 and 4 are schematic drawings of the parts of FIGS. 1 and 2 respectively after processing.

At the pulled-out part, all diameters have now been reduced by approximately 100:1. The original cores of the waveguides over the pulled-out part will have become vanishingly small. The electric field associated with the vanished cores spreads to the cladding previously surrounding those cores and that cladding will form new cores clad by the drawn-down part of the capillary tube 1. FIG. 3 shows the final shape of the assembly after pulling.

The transfer of energy into and out of what is now a new length of optical waveguide intermediate the waveguides 2 and 3 takes place gradually over a length of the intermediate waveguide equal to a large number of free space wavelengths, and without reflections occurring to any substantial extent.

Forming the junction can be achieved manually or by machinery which holds the capillary tube, positions the waveguides, heats and then pulls out the capillary tube to that length which gives the requisite reduction in diameter.

The technique just described can be adapted to couple two waveguides together to effect a partial or complete energy transfer from one waveguide to the other. Energy transfer can be effected by positioning the cores of two identical waveguides sufficiently closely over a critical distance.

Figure 2:
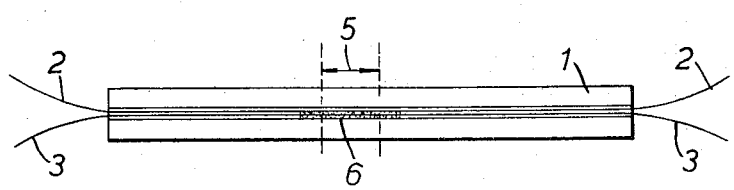

The procedure for making the coupling involves threading both waveguides through the bore of a capillary tube whose refractive index is the same as the tube 1 described above in connection with FIGS. 1 and 3 but the diameter of the bore is slightly larger. FIG. 2 shows the capillary tube 1 threaded completely through with optical waveguides 2, 3 to be coupled together. Prior to the threading of waveguide 3, a short sleeve 6 of length 2-3 cm. is threaded over the waveguide and positioned to lie at about the centre of the capillary tube 1. The sleeve is a thin-walled glass tube whose refractive index has a value the same as that of the capillary tube.

The part 5 of the capillary tube 1 of FIG. 2 is now heated to softening temperature and then pulled-out to form a filament of the same diameter as that of the waveguides 2, 3.

As described above the original cores of the waveguides become vanishingly small and the original claddings take the place of the vanished cores. The pulled-out capillary tube becomes the new cladding whilst the pulled-out sleeve 6 keeps the new cores a fixed distance apart.

Figure 4:

The final form of the composite structure is shown in FIG. 4.

Over the length of the pulled-out sleeve 6, the cores of the waveguides are a known distance apart and these parameters determine the degree of coupling and hence the extent of energy transfer. The closer the cores the tighter is the coupling for a given length of sleeve 6. The length of the pulled-out sleeve determines the number of energy transfers from one core to the other and this must be kept to a minimum—preferably one complete or one partial transfer.

If the sleeve 6 is of a material whose refractive index is dependent upon the strength of an electric field applied to it, variation of the coupling between the cores can be effected by varying the strength of the electric field. If the cores are relatively close together and the pulled-out sleeve 6 is relatively long, there will be a large number of energy transfers between the cores and a comparatively small change in refractive index will produce a complete energy transfer from one core to the other.

Figure 5:
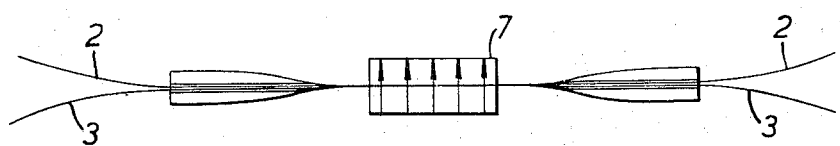
FIG. 5 is a schematic drawing of a light modulator.

FIG. 5 shows, in schematic form only, a microwave modulator. Waveguides 2, 3 are coupled together by use of the technique described above with reference to FIGS. 2 and 4 but using a sleeve 6 of material whose refractive index changes in value with changes in the strength of an applied electric field. The pulled-out sleeve length is placed across a metal waveguide 7 in a plane of uniform phase of electric field as shown which is made variable.

The same arrangement will also act as a detector. Local oscillator power is fed down one of the optical waveguides whilst the signal to be demodulated is fed down the other. The local oscillator power produces a very high electric field in the pulled-out material between the cores of the two waveguides in the coupling section. The refractive index of that material changes and because of the non-linearity there is detection of the signal, and the demodulated signal is radiated into the metal waveguide.

We claim:

1. A method of coupling together for energy transfer two separate composite glass fibers each having a glass core whose diameter is of the order of the free space wavelength of light to be propagated along the same, and each having its core coated with a glass cladding material whose refractive index is less than that of the core material, such method comprising the steps of
   (a) squaring off the ends of the two composite glass fibers,
   (b) providing a capillary glass tube having a refractive index lower than that of said glass cladding material and of an internal diameter about equal to the diameter of one of said composite glass fibers,
   (c) inserting the squared off ends of the composite glass fibers longitudinally into said capillary tube from opposite ends thereof until said squared off ends abut one another,
   (d) heating that part of the capillary tube surrounding the abutting ends of said composite fibers to a temperature sufficient to soften the capillary tube and composite fibers and fuse the fibers together and to the tube, and
   (e) pulling the so heated parts until the outside diameter of the tube becomes reduced to a value substantially equal to that of the diameter of the original composite glass fibers and the portions of the cores of said fibers within the pulled out part become vanishingly small.

2. A method of coupling together for energy transfer two separate composite glass fibers each having a glass core whose diameter is of the order of the free space wavelength of light to be propagated along the same, and each having its core coated with a glass cladding material whose refractive index is less than that of the core material, such method comprising the steps of
   (a) providing a capillary glass tube having a refractive index lower than that of said glass cladding and of an internal size to receive two of said composite fibers in side-by-side juxtaposed relation,
   (b) inserting two of said composite fibers into said tube in side-by-side juxtaposed relation,
   (c) heating a part of the capillary tube surrounding juxtaposed portions of said composite fibers to a temperature sufficient to soften the capillary tube and composite fibers and fuse the fibers together and to the tube, and (d) pulling the so heated part until the outside diameter of the tube becomes reduced to a value substantially equal to that of the original composite glass fibers and the portions of the cores of said fibers within the pulled out part become vanishingly small.

3. A method of coupling together for energy transfer two separate composite glass fibers each having a glass core whose diameter is of the order of the free space wavelength of light to be propagated along the same, and each having its core coated with a glass cladding material whose refractive index is less than that of the core material, such method comprising the steps of (a) providing a capillary glass tube having a refractive index lower than that of said glass cladding and providing and threading onto one of said composite fibers a sleeve of glass having a refractive index value substantially the same as that of said tube, said tube having an internal size to receive said sleeved composite fiber and the other of said two composite fibers in side-by-side juxtaposed relation, (b) inserting the sleeved portion of said sleeved composite fiber and the other of said two composite fibers into said tube in side-by-side juxtaposed relation, (c) heating a part of the capillary tube surrounding said two composite fibers and said sleeve to a temperature sufficient to soften said capillary tube and said sleeve and fibers and fuse the fibers and sleeve together and to the tube, and (d) pulling the so heated part until the outside diameter of the tube becomes reduced to a value substantially equal to that of the original composite glass fibers and the portions of the cores of said fibers within the pulled out part become vanishingly small.

4. A method as claimed in claim 3, wherein the sleeve of glass provided and threaded onto one of said composite fibers in step (a) has a refractive index susceptible of being varied to different values by varying the strength of an electric field applied thereto.

References Cited

UNITED STATES PATENTS

| | | | |
|---|---|---|---|
| 2,197,753 | 4/1940 | Liebmanh | 65—LRD16 |
| 2,608,722 | 9/1952 | Stuetzer | 65—4X |
| 2,636,125 | 4/1953 | Southworth | 65—LRD16 |
| 2,752,731 | 7/1956 | Altosaar | 65—4X |
| 3,241,934 | 3/1966 | Granitsas et al. | 65—4X |
| 3,347,649 | 10/1967 | Singer Jr. | 65—LRD16 |
| 3,455,625 | 7/1969 | Brumlet et al. | 65—LRD16 |
| 3,455,667 | 7/1969 | Snitzer et al. | 65—4 |
| 3,455,668 | 7/1969 | Upton | 65—4X |

FRANK W. MIGA, Primary Examiner

U.S. Cl. X.R.

65—37, 38, 42, 60, 111, 155; 331—94.5; 350—96; 65—Light Rod Dig.